Sept. 18, 1962     G. HAMMESFAHR     3,054,141
APPARATUS FOR VULCANIZING RUBBER TIRES Filed Dec. 7, 1959     3 Sheets-Sheet 1

*Inventor:*
GÜNTER HAMMESFAHR
BY *Karl F. Ross*
AGENT

Sept. 18, 1962  G. HAMMESFAHR  3,054,141
APPARATUS FOR VULCANIZING RUBBER TIRES
Filed Dec. 7, 1959  3 Sheets-Sheet 3

Inventor:
GÜNTER HAMMESFAHR
BY Karl F. Ross
AGENT.

United States Patent Office 3,054,141
Patented Sept. 18, 1962

3,054,141
APPARATUS FOR VULCANIZING RUBBER TIRES
Günter Hammesfahr, Altendorfer Str. 40b,
Essen, Germany
Filed Dec. 7, 1959, Ser. No. 857,795
Claims priority, application Germany Dec. 8, 1958
5 Claims. (Cl. 18—6)

My present invention relates to apparatus for the vulcanization of pneumatic rubber tires for motor vehicles.

In my co-pending application Ser. No. 679,187, filed August 20, 1957, I have disclosed a vulcanization mold wherein a rubber body can be exposed to simultaneous treatment by a heating fluid passing through a tube in its interior and a radiant heating source positioned externally thereof. The system of that application was, however, suitable for the curing of only a single tire at a time.

My present invention has for its general object the provision of an improved vulcanization system whereby a stepped-up production rate may be attained. More particularly, my invention aims at providing means for simultaneously treating a plurality of mold-enclosed tires in staggered operating cycles, thus on the assembly-line principle, whereby a single worker can vulcanize these tires as fast as they can be charged into and removed from the mold.

A feature of the invention resides in the provision of a plurality of mold supports joined together for consecutive step-by-step advance through a plurality of treatment stations where each mold is individually subjected to external heating by a radiant source positioned for relative rotation about the mold axis. Some of the stations may also be left without heating means whereby, toward the end of its treatment cycle, each mold is allowed to cool off before being opened for the removal of its charge and the insertion of a still uncured tire at a special charging station.

Considered broadly, the invention may be realized with either an open or closed transport path, though in the case of an open path it will be necessary to provide means for returning the empty molds to the point of origin. The movement of the molds, e.g. on rail-supported carriages, may be effected by various types of conveyors, yet I prefer to arrange them on a rotatable frame along whose periphery the molds are carried at angularly equispaced locations. A single, conveniently accessible charging station will usually suffice, yet in some instances (e.g. where tires of different thickness are to be vulcanized) it may be desirable to provide supplemental discharge stations ahead of it so that a faster-curing tire can be removed earlier in the cycle. Advantageously, an overall heat shield or cowl surrounds the molds along their entire path or at least during the heating portions of the cycle.

A more specific feature of the present invention resides in the provision of relatively rotatable heating jackets which are axially displaceable toward the temporarily stationary molds so as to form a substantially closed heating chamber therearound. The heat-reflecting cowl may be omitted where the jackets are closable in this manner.

The above and other objects, features and advantages of my present invention will become more readily apparent from the following description, reference being made to the accompanying drawing in which.

Figure 1:
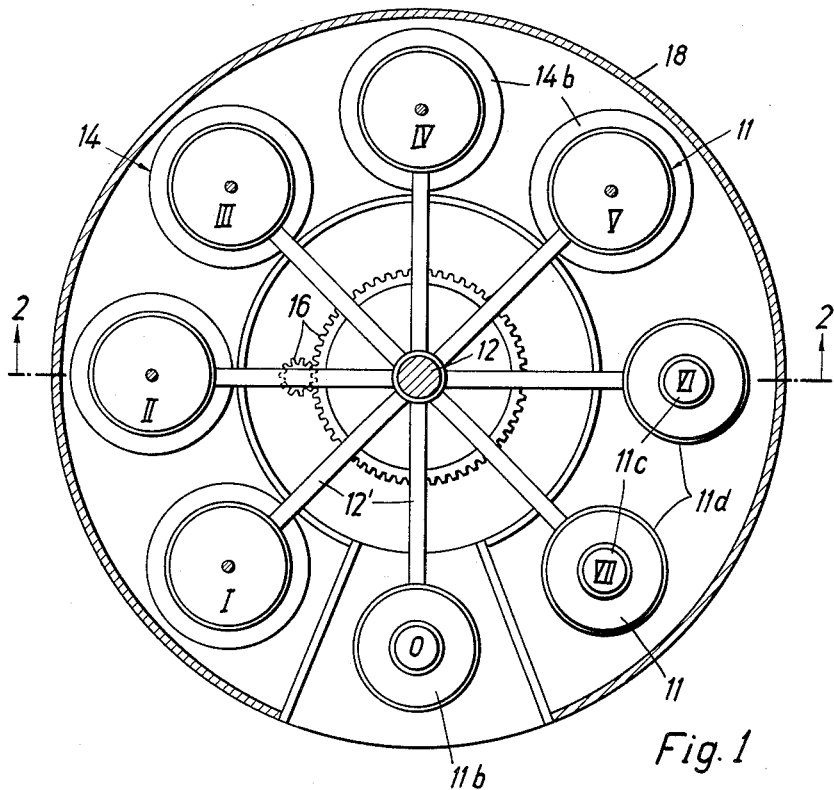
FIG. 1 is a top-plan view, in section on the line 1—1 of FIG. 2, of a vulcanization apparatus according to the invention.
Figure 2:
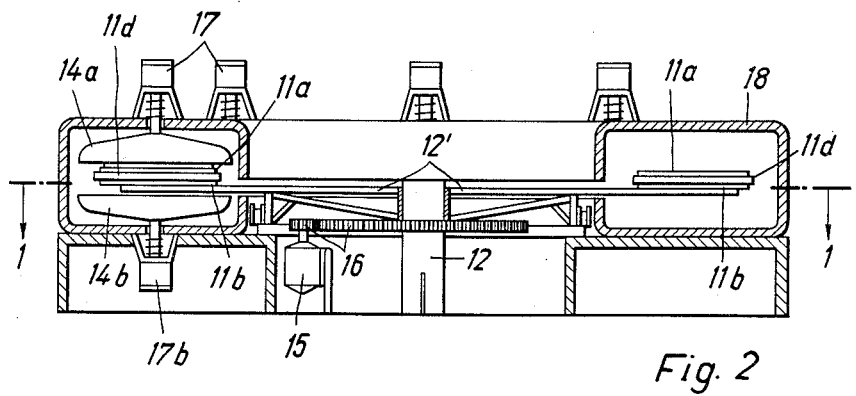
FIG. 2 is a cross-sectional view taken along line 2—2 of FIG. 1.

In FIGS. 1 and 2 of the drawing I show an installation for vulcanizing rubber tires, comprising an annular cowl 18 and transport means in the form of a rotating support having a plurality of radial spokes 12' rigidly secured to a central hub 12; hub 12 is concentric with the annular cowl 18 and driven by a motor 15 via reduction gearing 16. At the extremity of each spoke 12' I provide a mold 11 which consists of two annular halves 11a, 11b held together by a suitable fastening means including inner and outer clamping rings 11c, 11d, e.g. as shown in my above-identified co-pending application. The lower half 11b of each mold 11 is carried on a respective spoke 12', the upper half 11a being clamped in place after the charging of the mold. The molds 11 are adapted to be intermittently displaced along a circular path including eight angularly equispaced stations, namely heating stations I, II, III, IV, V, cooling stations VI, VII and a charging station O, the latter being positioned outside the cowl 18. A suitable controller, not shown, causes the motor 15 to stop for a predetermined period after every advance of the assembly 11, 12, 12' through an angle of 45°. Each heating station I to V is provided with radiant heating means in the form of a vertically split jacket 14 comprising an upper portion 14a and a lower portion 14b adapted to concentrate thermal radiation upon the mold 11. The heating jacket may be equipped with infra-red radiators (e.g. as shown at 54 in FIG. 5) or other radiant-energy sources such as gamma-ray emitters. The upper and lower portions 14a, 14b of the jackets 14 form radiation shields which are adapted to be rotated relatively to the molds 11 about the axes thereof to distribute the radiant energy most effectively. This rotation is here accomplished by individual upper and lower drive motors 17a, 17b, via shafts 17 journaled in the annular cowl 18. The separation of the jacket portions is sufficient to allow for the passage of the molds 11 and the spokes 12' therebetween. No heaters are provided at the cooling stations VI and VII.

In operation, a mold 11 arriving at position O is opened, emptied, charged with a fresh tire to be vulcanized, closed and clamped during the standstill of motor 15. When rotation is resumed, the so charged mold travels in clockwise direction (as viewed in FIG. 1) to the several heating stations I to V, where vulcanization takes place, and thence via cooling stations VI, VII back to the charging station O. Advantageously, a heated fluid under pressure (e.g. steam) is admitted to the interior of the mold at the heating stations and withdrawn at the cooling stations so that the cured tire can be easily removed at station O. The circulation of such fluid to and from the mold may be conveniently carried out through channels 55 in spokes 12' as illustrated in FIG. 4.

Figure 3:
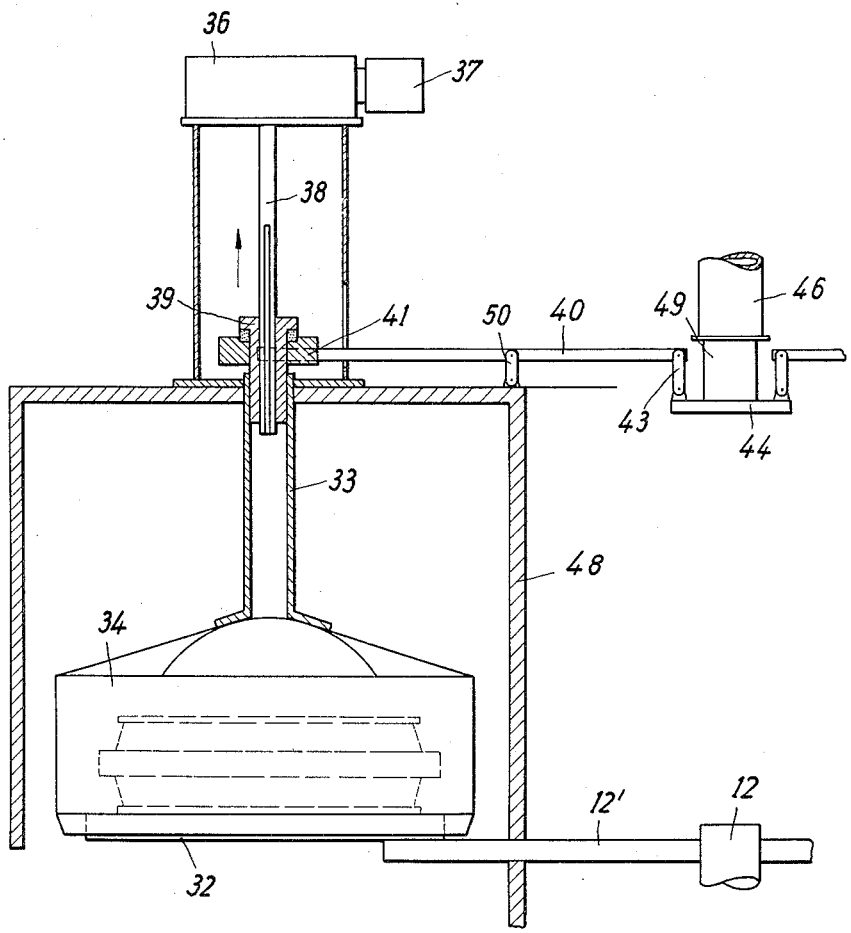
FIG. 3 is a cross-sectional view of a heating station adapted to be used in an installation similar to that shown in FIGS. 1 and 2.
Figure 4:
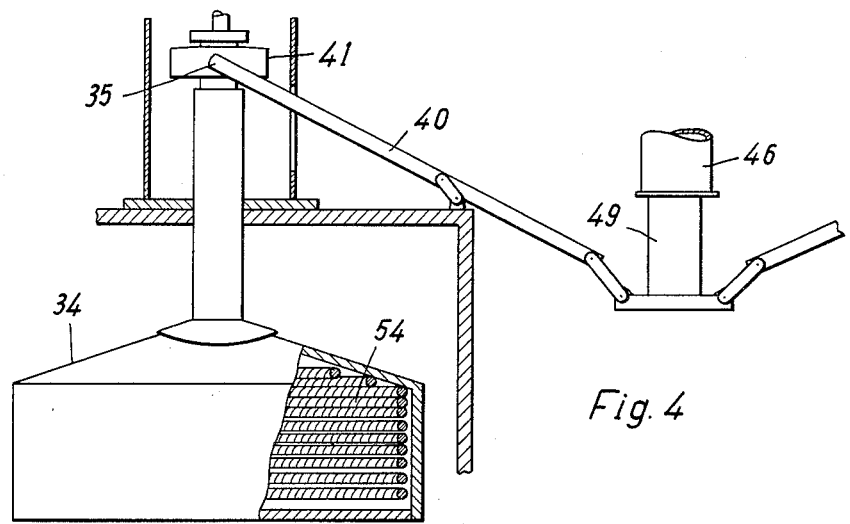
FIG. 4 is a similar view of the heating station with the displaceable jacket thereof in its inoperative position.

In FIGS. 3 and 4 I show a heating station comprising a bell-shaped heating jacket 34 adapted to envelop a mold 11 carried at the end of a spoke 12' on a platform 32. Jacket 34 has a stem 33 vertically displaceable and rotatable in the upper part of cowl 48 in order to be lowered around a mold 11 whenever the mold-supporting frame 12, 12' has come to rest, being again lifted thereafter to permit the further movement of the molds. This vertical displacement is effected by a lever 40 whose bifurcate end is hinged at 35 to a sleeve 41 within which a collar 39, rigid with the stem 33, is journaled to permit the rotation of the jacket 34. The latter is driven by a motor 37 through a reducing gear 36 via a shaft 38 keyed to collar 39. The levers 40 of the several heating stations are articulated to a common bearing plate 44 by links 43 and to the cowl 48 by a link 42 which serves as a fulcrum therefor. The bearing plate 44 is downwardly displaceable along the axis of shaft 12, to cause an upward displacement of the jacket 34, by a piston rod 49 reciprocable within a hydraulic cylinder 46. The cylinder is actuated simultaneously with the re-starting of motor 15 (FIG. 1) to raise the jackets 34 off the molds 11 around which, together with platform 32, they had previously formed almost completely closed heating chambers.

Each mold 11 may be provided with an inner inflatable tube whose entrance port may register with a passage 53 in platform 32, this passage communicating with fluid channel 55 of spoke 12' to admit a hot treating fluid under pressure to the interior of the tire within the mold. The rotating jacket 34 is provided with a plurality of heating elements 54, advantageously of different intensities or with different spacing so that the amount of heat radiated upon different annular zones of the molded body varies according to wall thickness. Generally, as explained in my aforementioned application Ser. No. 679,187, the tread portions of the tire require the greatest heating rate for proper curing.

Figure 5:
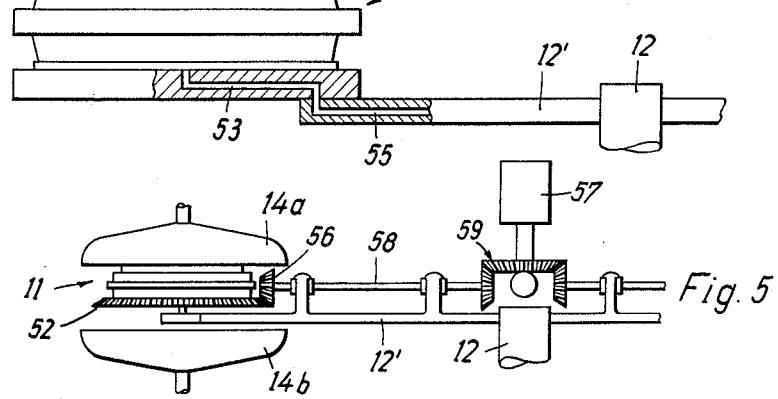
FIGS. 5 and 6 are fragmentary views, respectively similar to FIGS. 1 and 3, of two further modifications.

Although in FIGS. 1 and 2 the heating-jacket halves 14a, 14b are shown to be rotatable about the axes of the momentarily arrested molds 11, it is possible instead to rotate the molds and to maintain the heating jackets stationary, or to rotate both in relatively opposite senses. Moreover, in lieu of the individual motors 17a, 17b it is possible to provide a central power source for driving the heating jackets and/or the molds. Both of these features are illustrated in FIG. 5 which shows the molds 11 rotatably supported on platforms 52 journaled in the respective spokes 12' of the rotatable frame. Each platform 52 is provided with bevel-gear teeth meshing with a bevel gear 56 on a shaft 58, the latter extending parallel to the spoke 12' and being driven via a transmission 59 from a motor 57 common to all the mold supports 52; the shaft of motor 57 is co-axial with frame shaft 12 but rotatable independently thereof.

Figure 6:
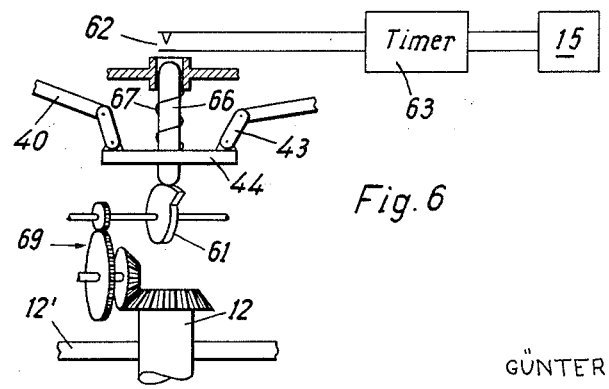

The lowering of a heating jacket 34 around a mold 11 must be timed to coincide exactly with the instant at which the mold has come to a rest beneath it. This is accomplished in the system of FIGS. 3 and 4 by controlling the hydraulic cylinder 46 from the same governor which times the starting and stopping of motor 15 (FIG. 2). More positive synchronization can be had, however, with the aid of camming means controlled directly by the rotating frame itself. This has been illustrated in FIG. 6 where the shaft 12, bearing the spokes 12', is connected via a transmission 69 with an auxiliary shaft 60 carrying a cam 61. Shaft 60 rotates eight times as fast as shaft 12, hence the cam 61 performs one revolution whenever a mold passes from one station to the next. As the mold arrives at a station, the hump of cam 61 lifts a rod 66 against the force of a spring 67, this rod being rigid with the previously described bearing plate 44 to which the levers 40 are articulated by links 43. It will be understood that the lowering of heating jackets 34 upon the raising of rod 66 occurs so rapidly that the mold moves but a short distance during this operation. When the rod 66 has risen to its greatest elevation, with a corresponding lowering of jackets 34 into the position illustrated in FIG. 3, it closes contacts 62 to actuate a timer 63 which in turn arrests the motor 15 and subsequently re-starts it after a predetermined interval, for the purpose previously explained. Again, the resumption of motion by the mold would be so slow compared with the rotation of cam 61 that the jacket 34 will have risen before the mold has moved over a very short distance.

Other modifications and variations, readily apparent to persons skilled in the art, are intended to be included within the spirit and scope of my invention except as further limited by the appended claims.

I claim:

1. A system for vulcanizing rubber tires, comprising a plurality of mold supports spaced apart along a predetermined path of advance, transport means for simultaneously displacing said supports along said path in a step-by-step movement whereby said supports are arrested for limited periods at predetermined locations, and a plurality of heating means respectively disposed on at least some of said locations; each of said heating means comprising a source of radiant heat, drive means for relatively rotating said source and an adjacent mold support about a common axis, said source forming at least a partial enclosure about said adjacent support and mechanism synchronized with said transport means for axially displacing said source from a retracted position into a support-enveloping position and subsequently returning said source to said retracted position during each of said periods.

2. A system according to claim 1 wherein said source comprises at least one rotatable heating jacket, said drive means including a motor individually connected with said heating jacket.

3. A system for vulcanizing rubber tires, comprising a frame rotatable about a vertical axis, a plurality of mold supports on said frame angularly equispaced from one another along a circular arc, a plurality of correspondingly equispaced stations in the path of said supports, at least several of said stations being individually provided with a radiant heat source and a carrier for said source, said carrier comprising a generally bell-shaped jacket vertically displaceable toward and away from said support, operating means for intermittently rotating said frame and periodically arresting it with certain of said mold supports in alignment with respective ones of said carriers, mechanism synchronized with said operating means for displacing said jacket toward a support substantially aligned therewith and for subsequently withdrawing said jacket into a retracted position permitting the further advance of the support, and drive means for relatively rotating said carriers and the aligned mold supports about respective mold axes.

4. A system according to claim 3 wherein said jacket comprises two co-axial portions respectively positioned above and below the path of said supports, drive means comprising an individual motor for each of said jacket portions.

5. A system according to claim 3 wherein said jacket substantially completely envelops a mold disposed on said support in its position of closest approach thereto but is spaced from said mold with peripheral clearance permitting uniform distribution of heat to said mold.

References Cited in the file of this patent

UNITED STATES PATENTS

| 1,199,449 | Burns | Sept. 26, 1916 |
| 1,751,869 | Mayne | Mar. 25, 1930 |
| 2,094,511 | Welch | Sept. 28, 1937 |
| 2,828,508 | Labarre | Apr. 1, 1958 |
| 2,834,986 | Bailey et al. | May 30, 1958 |